United States Patent [19]
Liu

[11] Patent Number: 5,689,142
[45] Date of Patent: Nov. 18, 1997

[54] KEYLESS MOTOR VEHICLE STARTING SYSTEM WITH ANTI-THEFT FEATURE

[75] Inventor: Chunyan Liu, Elizabeth, N.J.

[73] Assignee: Continocean Tech Inc., Montville, N.J.

[21] Appl. No.: 653,496

[22] Filed: May 24, 1996

[51] Int. Cl.[6] .................................................. B60R 25/04
[52] U.S. Cl. ........................ 307/10.5; 123/179.2; 180/287
[58] Field of Search .................. 307/10.1–10.6; 180/287; 340/425.5, 426, 825.69, 825.72, 825.3–825.32, 825.34, 825.54; 123/179.1–179.4

[56] References Cited

U.S. PATENT DOCUMENTS

| | | |
|---|---|---|
| 3,054,904 | 9/1962 | Fuciarelli . |
| 3,124,118 | 3/1964 | Sibert . |
| 3,553,472 | 1/1971 | Aklandson et al. . |
| 3,577,164 | 5/1971 | Baratelli et al. . |
| 3,603,802 | 9/1971 | Petric . |
| 3,657,720 | 4/1972 | Avdenko et al. . |
| 3,790,806 | 2/1974 | Lessard . |
| 4,236,594 | 12/1980 | Ramsperger ........................ 307/10.2 |
| 4,674,454 | 6/1987 | Phairr ................................. 123/179.2 |
| 4,893,240 | 1/1990 | Karkouti ............................ 123/179.3 |
| 4,928,778 | 5/1990 | Tin . |
| 5,224,507 | 7/1993 | Tomlinson ........................... 180/287 |
| 5,287,006 | 2/1994 | Carlo et al. . |
| 5,293,160 | 3/1994 | Kurozu et al. ..................... 340/825.32 |
| 5,343,077 | 8/1994 | Yoshida et al. ..................... 307/10.3 |
| 5,449,957 | 9/1995 | Carlo . |
| 5,453,730 | 9/1995 | De-Grinis . |

Primary Examiner—Richard T. Elms

[57] ABSTRACT

A keyless motor vehicle starting system to replace a conventional ignition lock and ignition key of a motor vehicle. The system consists of a portable wireless transmitter and a receiver/controller board which is installed deeply inside the motor vehicle behind a steering column cover or cluster cover of the motor vehicle. The portable wireless transmitter has a power-code generator and a starter-code generator and controls a vehicle battery power supply and ON-OFF states of a motor vehicle starter by sending a radio-frequency-modulated power-code and starter code. A novel design is disclosed to avoid having to detect engine-running conditions and avoid using a feed-back-control circuit to de-energize the motor starter.

9 Claims, 3 Drawing Sheets

KEYLESS MOTOR VEHICLE STARTING SYSTEM WITH ANTI-THEFT FEATURE

BACKGROUND OF THE INVENTION

This invention relates to a keyless motor vehicle starting system with an anti-theft feature, more specifically, to a motor vehicle starting system which replaces a conventional ignition lock and ignition key of a motor vehicle and prevents unauthorized starting of the motor vehicle, and accordingly to the manner of operation of a vehicle with the invented system installed.

In existing motor vehicles an ignition lock with an ignition key is always used to protect motor vehicles from being stolen and to provide means for conveniently starting and stalling motor vehicle engines. However, the ignition lock with the ignition key has failed to protect motor vehicles satisfactorily from being stolen since an ignition lock can be relatively easily broken and bypassed and the motor vehicle can be started by an unauthorized person without using an ignition key. Many anti-theft devices have been designed to overcome the problem. These devices provide extra protection for motor vehicles in addition to the existing ignition lock. Although some of the anti-theft devices provide effective protection for motor vehicles, a driver always has to carry and operate both an anti-theft device controller and an ignition key and manufacturers and service-providers have to manufacture and install both anti-theft devices and ignition locks.

On the other hand, some remote vehicle-starting devices have been disclosed to act as an auxiliary addition to the conventional ignition lock/key starting system. These existing devices do not intend to replace the conventional ignition lock and ignition key, and have to use complicated circuits and therefore are expensive to manufacture. Two vehicle-starting systems installed in one car also add extra manufacturing cost. These devices are also inconvenient for drivers since they have to carry and operate both ignition keys and remote-starting controllers. In addition, they do not provide needed anti-theft features.

An object of this invention is to use an electronic device to replace the conventional ignition lock and ignition key and to provide a reliable, highly secure, user-friendly and low-cost motor vehicle starting system.

Another object of this invention is to avoid having to detect engine-running conditions and avoid using a feed-back-control circuit to de-energize the motor starter and therefore overcome the problems of lower reliability and higher manufacturing cost associated with the existing remote-starting devices.

PRIOR ART

There exist many patents which disclose methods and techniques for adding anti-theft devices or adding remote starting devices to existing vehicle-starting systems without changing the conventional ignition lock/key starting system.

Anti-theft features are added to the conventional ignition lock/key starting systems in, for example, U.S. Pat. No. 5,287,006, U.S. Pat. No. 5,449,957, and U.S. Pat. No. 5,453,730. These devices disable engine-starting systems using remote-controlled switches. They do not provide any starting capabilities without using ignition keys.

Remote starting features are added to the conventional ignition lock/key starting systems in U.S. Pat. No. 3,054,904, U.S. Pat. No. 3,124,118, U.S. Pat. No. 3,553,472, U.S. Pat. No. 3,577,164, U.S. Pat. No. 3,603,802, U.S. Pat. No. 3,657,720, U.S. Pat. No. 3,790,806 and U.S. Pat. No. 4,928,778. These devices provide an auxiliary remote starting feature and do not intend to replace the conventional ignition lock/key starting systems. They also do not provide any anti-theft features. In addition, a common problem with these devices is that they all need to detect the engine-running condition and de-energize the motor starter once an engine-running condition is detected. These engine-running detection and feedback-control circuits are not reliable and are complicated and expensive to manufacture.

SUMMARY OF THE INVENTION

The goal of this invention is to use an electronic device to replace the conventional ignition lock and ignition key and to provide a reliable, highly secure, user-friendly and low-cost motor vehicle starting system. A novel design is disclosed to avoid having to detect engine-running conditions and avoid using a feed-back-control circuit to de-energize the motor starter and therefore overcome the problems of lower reliability and higher manufacturing cost associated with the existing remote-starting devices.

The keyless vehicle starting system in this invention consists of a portable wireless transmitter and a receiving/controlling board which is installed deep inside a vehicle, preferably behind the steering column cover or cluster cover of the vehicle. The portable wireless transmitter includes a power-code generator, a starter-code generator, a radio-frequency (RF) modulator, a battery and two normal-off button switches: a power-code switch and a starter-code switch. The power-code switch is used to turn on and off the power-code generator. The starter-code switch is used to turn on and off the starter-code generator.

The receiving/controlling board has an RF demodulator, a starter-code detector, a power-code detector, a starter switch and a flip-flop switch. When the starter-code from the portable wireless transmitter is properly detected by the starter-code detector, the starter-code detector turns on the starter-solenoid side of the starter switch and turns off additional electrical components of the vehicle which are not relied-upon to energize/enable the ignition/starting circuits of the vehicle. If the starter-code from the portable wireless transmitter is not detected, the starter-code detector turns off the starter-solenoid side of the starter switch and turns on other electrical components of the vehicle. Whenever the power-code switch on the portable wireless transmitter is pressed once and the power-code is detected by the power-detector, the power-detector changes the 'ON-OFF' state of the flip-flop switch and accordingly the 'ON-OFF' state of the vehicle battery power supply. The starter switch and the flip-flop switch are used to replace an ignition switch in a conventional motor vehicle.

To start a motor vehicle equipped with the keyless starting system in this invention, the power-code switch on the portable wireless transmitter is pressed momentarily to turn on the vehicle battery power supply. Then the starter-code switch on the portable wireless transmitter is pressed and held until the engine of the vehicle is started. To stab the engine of the motor vehicle when the engine is running, the driver only needs to press the power-code switch once again.

DETAILED DESCRIPTION

Figure 1:
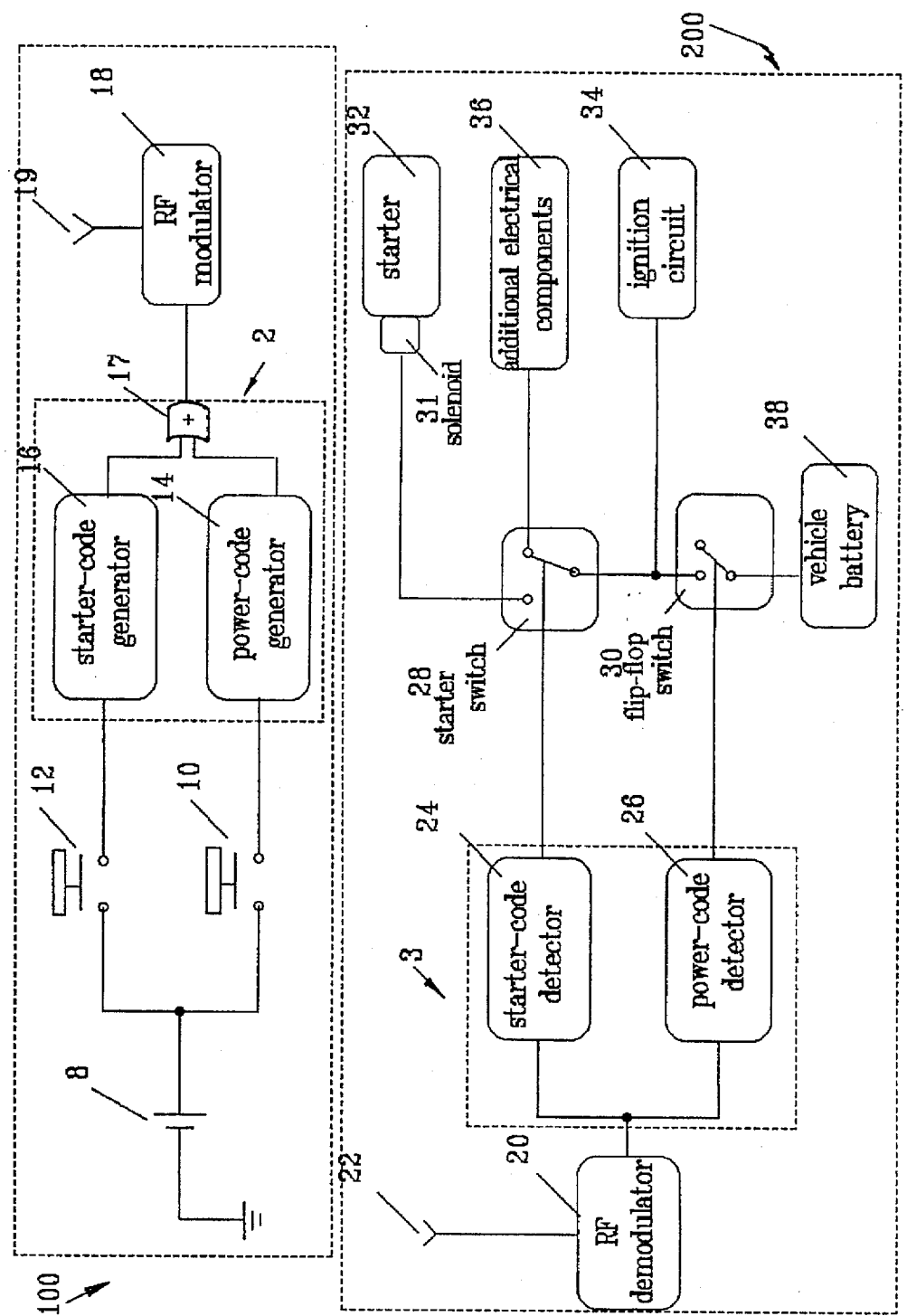
FIG. 1 is a schematic diagram illustrating one embodiment of a system employing the keyless starting device of the present invention.

Referring to FIG. 1, a conventional motor vehicle has a starter 32 with a solenoid 31 on it, an ignition circuit 34, a vehicle battery 38 and additional electrical components 36, such as vehicle head-light, fan, wiper, defroster, air conditioner, radio, etc., which are not relied-upon the energize/enable the vehicle ignition/starting system. The ignition switch in a conventional motor vehicle is replaced by the keyless starting device disclosed in this invention. In addition to the components from the conventional motor vehicle, the keyless starting system comprises two major parts: a portable wireless transmitter, and a receiver/controller board.

The portable wireless transmitter 100 comprises a battery 8, a power-code switch 10, a starter-code switch 12, a power-code generator 14, a starter-code generator 16, an OR-gate 17, a radio frequency (RF) modulator 18 and an antenna 19. The combination of the power-code generator 14, starter-code generator 16 and OR-gate 17 is designated by numeral 2.

The receiver/controller board 200 is preferably installed deep inside the motor vehicle behind the steering column cover or cluster cover, and comprises an antenna 22, an RF demodulator 20, a starter-code detector 24, a power-code detector 26, a starter switch 28, and a flip-flop switch 30. The combination of the power-code detector 26 and starter-code detector 24 is designated by the numeral 3.

The power-code generator 14 generates a code to control the ON-OFF state of the vehicle battery power supply 38. The starter-code generator 16 generates a code to control the motor starter 32 and the additional electrical components 36. The power-code switch 10 is preferably a push-button switch and turns on the power-code generator 14 when the switch 10 is pressed. The starter-code switch 12 is preferably a push-button switch and turns on the starter-code generator 16 when the switch 12 is pressed. Both the power-code from the power-code generator 14 and the starter-code from the starter-code generator 16 are a series of 0 and 1's which are encoded according to a certain rule. It is noted that only one of the switches 10 and 12 should be pressed at a time. When neither of the switches 10 and 12 is pressed, the output of the power-code generator 14 and starter-code generator 16 is all 0's. The OR-gate 17 combines the output of the power-code generator 14 and the output of the starter-code generator 16 and sends the combined code to the RF modulator 18. The RF signal from the RF modulator 18 is fed into the antenna 19 to be transmitted to the air.

The RF signal from the portable wireless transmitter is received by the antenna 22 and demodulated by the RF demodulator 20 which then generates a demodulated signal.

The demodulated signal from the RF demodulator 20 should be a starter-code, or a power-code, or none of them, depending on which push-button switch on the portable wireless transmitter is pressed. The demodulated signal is fed into both the starter-code detector 24 and the power-code detector 26. If the demodulated signal is a power-code, the power-code detector 26 sends a high voltage to the flip-flop switch 30 and the starter-code detector 24 sends a low voltage to the starter throw switch 28. If the demodulated signal is a starter-code, the power-code detector 26 sends a low voltage to the flip-flop switch 30 and the starter-code detector 24 sends a high voltage to the starter switch 28. If the demodulated signal is neither a power-code nor a starter-code, the power-code detector 26 sends a low voltage to the flip-flop switch 30 and the starter-code detector 24 sends a low voltage to the starter switch 28.

The flip-flop switch 30 has two states, namely an ON-state and an OFF-state. If a low-to-high voltage change is fed to the flip-flop switch 30 from the power-code detector 26, the flip-flop switch 30 changes its state from an ON-state to an OFF-state or from an OFF-state to an ON-state. If no low-to-high voltage change is fed to the flip-flop switch 30 from the power-code detector 26, the flip-flop switch 30 stays at its current state. One end of the flip-flop switch 30 is connected to the vehicle battery 38 and the other end is connected to the ignition circuit 34 and one end of the starter switch 28. When the flip-flop switch 30 is in an ON-state, the vehicle battery 38 is connected to the ignition circuit 34 and to one end of the starter switch 28. When the flip-flop switch 30 is in an OFF-state, the vehicle battery 38 is disconnected from the ignition circuit 34 and disconnected from the starter switch 28.

If a high voltage is fed to the starter switch 28 from the starter-code detector 24, the starter switch 28 connects the starter solenoid 31 to one end of the flip-flop switch 30 and disconnects the additional electrical components 36. If a low voltage is fed to the starter switch 28 from the starter-code detector 24, the starter switch 28 disconnects the starter solenoid 31 and connects the additional electrical components 36 to one end of the flip-flop switch 30. It is noted that the ignition switch in a conventional motor vehicle is replaced by the starter switch 28 and the flip-flop switch 30.

The operation of the keyless starting system is described as follows.

To start the motor vehicle, first press momentarily the power-code switch 10 on the portable wireless transmitter. Then the power-code is generated by the power-code generator 14 and modulates an RF signal through the RF modulator 18 and is transmitted to the air by the antenna 19. The RF signal is received by the antenna 22 on the receiver/controller board and is demodulated by the RF demodulator 20 and is converted back to the power-code generated by the power-code generator 14. The power-code detector 26 then detects the power-code and sends a high voltage to the flip-flop switch 30 to turn on the vehicle battery power supply 38 if the flip-flop switch was off, or turn off the vehicle battery power supply 38 if the flip-flop switch was on. Once the vehicle battery power supply 38 is turned on, press and hold the starter-code switch 12 on the portable wireless transmitter. Then a starter-code is generated by the starter-code generator 16 and modulates an RF signal through the RF modulator 18 and is transmitted to the air. The RF signal is received by the antenna 22 and is demodulated by the RF demodulator 20 and is converted back to the starter-code generated by the starter-code generator 16. The starter-code detector 24 then detects the starter-code and sends a high voltage to the starter switch 28 to turn on the starter and disconnect the additional electrical components 36. Once the engine of the motor vehicle is started, the starter-code switch 12 is released. Then the starter solenoid 31 is automatically disconnected from the battery power supply 38 and the additional electrical components are connected.

To stall the vehicle, press momentarily the power-code switch 10 on the portable wireless transmitter. Then the power-code is generated by the power-code generator 14 and modulates an RF signal through the RF modulator 18 and is transmitted to the air by the antenna 19. The RF signal is received by the antenna 22 on the receiver/controller board and is demodulated by the RF demodulator 20 and is converted back to the power-code generated by the power-code generator 14. The power-code detector 26 then detects the power-code and sends a high voltage to the flip-flop switch 30 and the state of the flip-flop switch 30 is changed from ON to OFF. Then the vehicle battery power supply 38 is disconnected and the engine is stalled.

Figure 2A:
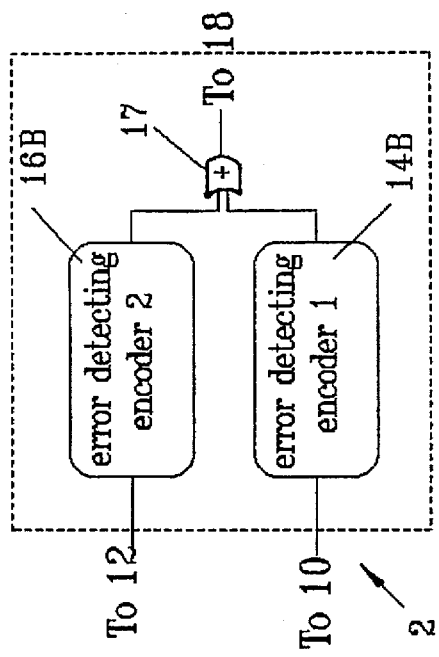
FIG. 2A illustrates a preferred implementation for the power-code generator and the starter-code generator using two pseudo-noise (PN) code generators.
Figure 3A:
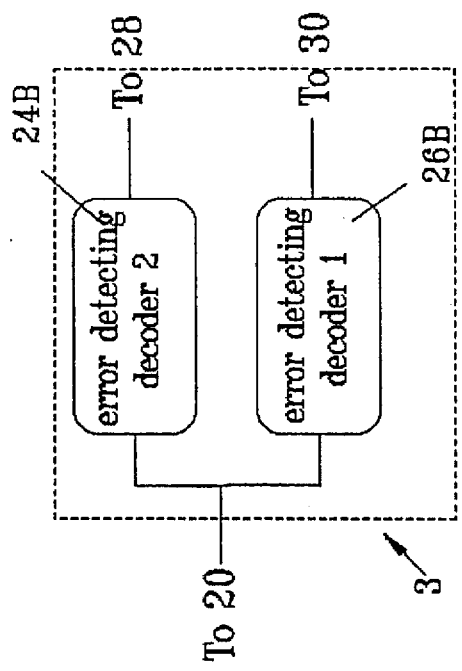
FIG. 3A illustrates a preferred implementation for the power-code detector and the starter-code detector using two pseudo-noise (PN) code detectors.

Referring to FIG. 2A, the power-code generator 14 and the starter-code generator 16 are implemented by using a pair of pseudo-noise code generators 14A, 16A. Each pseudo-noise code generator generates a unique pseudo-noise code. Referring to FIG. 3A, the starter copde detector 24 and the power-code detector 26 are then implemented by using a pair of pseudo-noise code detectors 24A, 26A. The pseudo-noise code generators and detectors are implemented by using shift registers as described in *Digital Communications*, McGraw-Hill, 2nd edition, 1989, by J. G. Proakis and in *Error Control Coding*, Prentice Hall, 1983, by S. Lin and D. J. Costello Jr.

Figure 2B:
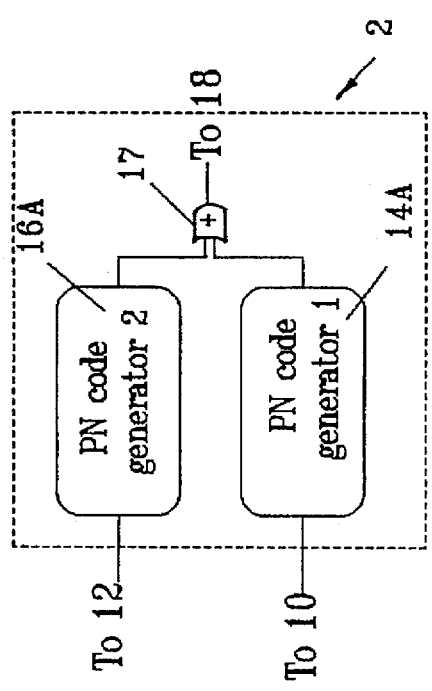
FIG. 2B illustrates an alternative implementation for the power-code generator and the starter-code generator using two pairs of error-detecting code generators and detectors.
Figure 3B:
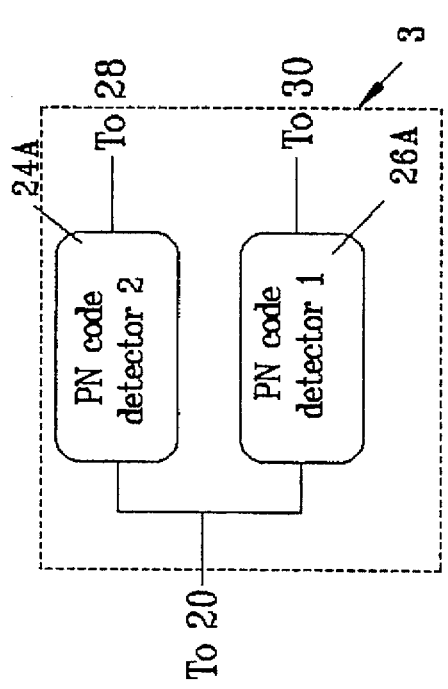
FIG. 3B illustrates a preferred implementation for the power-code detector and the starter-code detector using two error-detecting code detectors.

FIG. 2B and FIG. 3B describe an alternative implementation of the power-code generator 14, the starter-code generator 16, the power-code detector 26, and the starter-code detector 24. The power-code generator 14, and the starter-code generator 16 are implemented by using a pair of error-detecting encoders 14B, 16B. Each error-detecting encoder generates a unique error-detecting code. The starter-code detector 24 and the power-code detector 26 are then implemented by using a pair of error-detecting decoder 24B, 26B. The implementation of the error-detecting encoders and decoders is described in *Error Control Coding*, Prentice Hall, 1983, by S. Lin and D. J. Costello Jr.

Figure 4:
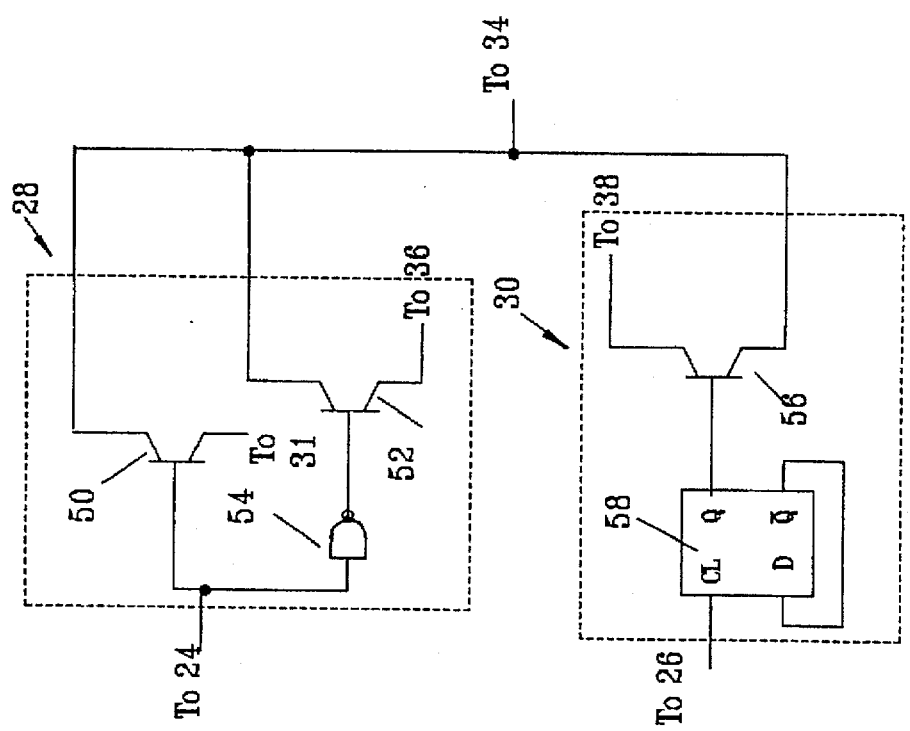
FIG. 4 illustrates a preferred implementation for the starter switch and the flip-flop switch using bipolar junction transistors.

FIG. 4 discloses a preferred implementation of the starter switch 28 and the flip-flop switch 30 by using bipolar junction transistors. The flip-flop switch 30 comprises a conventional D-flip-flop logic gate 58 and a bipolar junction transistor 56. The starter switch 28 comprises a bipolar junction transistor 50, another bipolar junction transistor 52 and a single-input NAND-gate 54. The D-flip-flop gate 58 has an input clock CL, an output Q, an inverted output $\overline{Q}$ which is connected to a D-input. The D-flip-flop 58 is triggered by a voltage-change at its clock input CL from a state '0' to a state T and then the output Q of the D-flip-flop 58 is inverted. If a 0-to-1 trigger does not exist at the clock input CL, the output Q of the D-flip-flop 58 does not change. The output Q of the D-flip-flop 58 is connected to the base of the bipolar junction transistor 56 and controls the ON and OFF of the transistor 56. The ON and OFF of the bipolar junction transistors 50 and 52 is controlled by the output from the starter-code detector 24. Since the output from the starter-code detector 24 is inverted by the single-input NAND gate 54 before it is fed into the base of the bipolar junction transistor 52, an ON state of the bipolar junction transistor 50 corresponds to an OFF state of the bipolar junction transistor 52, and an OFF state of the bipolar junction transistor 50 corresponds to an ON state of the bipolar junction transistor 52.

Figure 5:
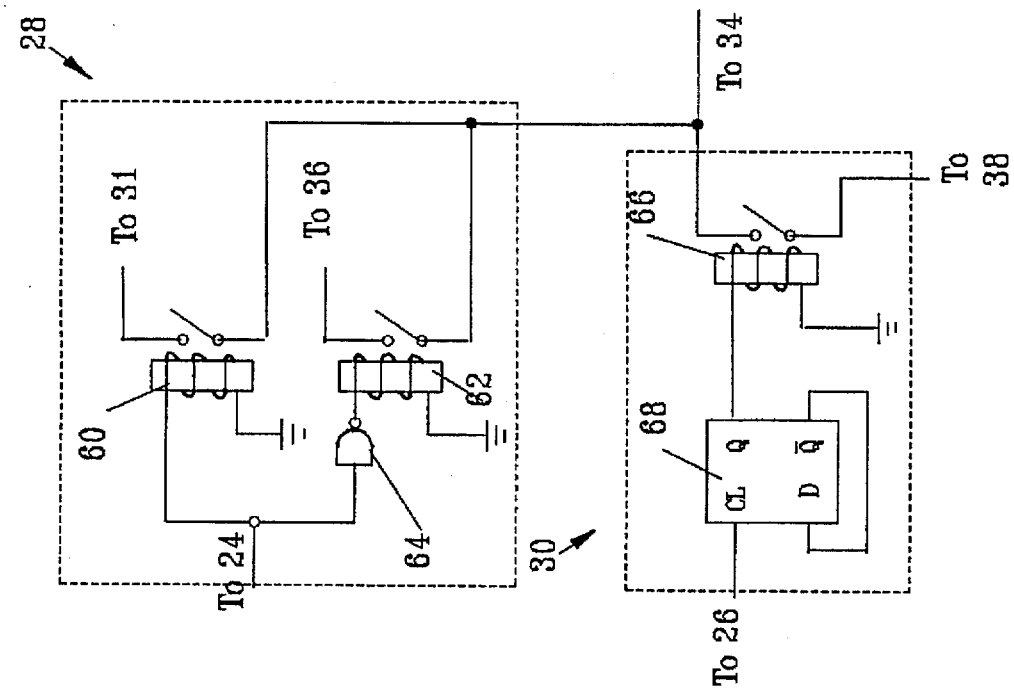
FIG. 5 illustrates an alternative implementation for the starter switch and the flip-flop switch using relays

FIG. 5 discloses an alternative implementation of the starter switch 28 and the flip-flop switch 30 by using relays. The flip-flop switch 30 comprises a conventional D-flip-flop logic gate 68 and a relay 66. The starter switch 28 comprises a relay 60, another relay 62 and a single-input NAND-gate 64. The operation of FIG. 5 is similar to that of FIG. 4.

The design of the electronic circuits for the RF modulator 18 and the RF demodulator 20 can be found in *Digital Communications*, McGraw-Hill, 2nd edition, 1989, by J. G. Proakis, *Engineering Electronics*, Prentice-Hall, 1989, by R. Mauro and *Electromagnetic Concepts and Applications*, Prentice-Hall, 2nd edition, 1987, by S. V. Marshall and G. Skitek.

While considerable emphasis has been herein on the preferred embodiment illustrated and described hereinabove, it will be appreciated that other embodiments of the invention can be made and that changes can be made in the preferred embodiment without departing from the principals of the present invention. Accordingly, it is to be distinctly understood that the foregoing descriptive matter is to be interpreted merely as illustrative of the invention and not as a limitation.

What is claimed is:

1. A keyless motor vehicle starting system comprising:

a motor starter;

a solenoid on said motor starter;

an ignition circuit;

a vehicle battery;

additional motor vehicle electrical components which are not relied-upon to energize/enable said motor starter and said ignition circuit;

a portable wireless transmitter which comprises:
  (a) a battery;
  (b) a power-code switch connected to said battery;
  (c) a starter-code switch connected to said battery;
  (d) a power-code generator which is connected to said power-code switch and generates a power-code when said power-code switch is turned on;
  (e) a starter-code generator which is connected to said starter-code switch and generates a starter-code when said starter-code switch is turned on;
  (f) an OR-gate which combines said starter-code and said power-code;
  (g) an electromagnetic-wave modulator which generates an electromagnetic-wave signal modulated by the output of said OR-gate;
  (h) an electromagnetic-wave transmitting means connected to the output-pin of said electromagnetic-wave modulator;

a receiver/controller board which comprises:
  (a) an electromagnetic-wave receiving means which generates a received electromagnetic-wave signal;
  (b) an electromagnetic-wave demodulator whose input-pin is connected to said electromagnetic-wave receiving means;
  (c) a starter-code detector which generates a detected-starter-code-signal and has an input-pin which is connected to the output-pin of said electromagnetic-wave demodulator;
  (d) a power-code detector which generates a detected-power-code-signal and has an input-pin which is connected to the output-pin of said electromagnetic-wave demodulator;
  (e) a power switch which is controlled by said detected-power-code-signal and is connected between said vehicle battery and said ignition circuit;

(f) a starter switch which is controlled by said detected-starter-code-signal and is connected between said power switch and said starter solenoid and between said power switch and said additional motor vehicle electrical components;

wherein said portable wireless transmitter and said receiver/controller board are used to replace an ignition lock, an ignition key and an ignition switch in a conventional motor vehicle.

2. The keyless motor vehicle starting system as defined in claim 1 wherein:

said power-code switch is a normal-off push-button switch and turns on said power-code generator when said power-code switch is pressed;

said starter-code switch is a normal-off push-button switch and turns on said starter-code generator when said starter-code switch is pressed;

said power-code from said power-code generator is a series of 0 and 1's which are encoded according to a first rule;

said starter-code from said starter-code generator is a series of 0 and 1's which are encoded according a second rule;

said power-code generator generates all 0's when said power-code switch is not pressed;

said starter-code generator generates all 0's when said starter-code switch is not pressed;

said OR-gate combines the output of said power-code generator and the output of said starter-code generator and generates a combined code which is sent to said electromagnetic-wave modulator which generates an electromagnetic-wave signal.

3. The keyless motor vehicle starting system as defined in claim 1 wherein:

said electromagnetic-wave demodulator demodulates said received electromagnetic-wave signal received by said electromagnetic-wave receiving means and generates a demodulated signal;

said demodulated signal is fed into said starter-code detector and said power-code detector;

said power-code detector sends a high voltage to said power switch if said demodulated signal is said power-code;

said power-code detector sends a low voltage to said power switch if said demodulated signal is not said power-code;

said starter-code detector sends a high voltage to said starter switch if said demodulated signal is said starter-code;

said starter-code detector sends a low voltage to said starter switch if said demodulated signal is not said starter-code;

said power switch has an ON-state and an OFF-state;

said starter switch has a first end which is connected to said power switch, a second end which is connected to said starter solenoid, and a third end which is connected to said additional vehicle electrical components;

said power switch is connected between said vehicle battery and said ignition circuit and is also connected between said vehicle battery and said first end of said starter switch;

the state of said power switch does not change if there is not any low-to-high voltage change fed into said power switch;

said power switch changes from said ON-state to said OFF-state or from said OFF-state to said ON-state if there is a low-to-high voltage change fed into said power switch;

said vehicle battery is connected to said ignition circuit and to said first end of said starter switch when said power switch is in said ON-state;

said vehicle battery is disconnected from said ignition circuit and disconnected from said first end of said starter switch when said power switch is in said OFF-state;

said starter switch connects said starter solenoid to one end of said power switch and disconnects said additional electrical components if a high voltage is fed to said starter switch;

said starter switch disconnects said starter solenoid from said power switch and connects said additional electrical components to one end of said power switch if a low voltage is fed to said starter switch.

4. The keyless motor vehicle starting system as defined in claim 1 wherein:

said power-code is a first pseudo-noise code;

said starter-code is a second pseudo-noise code;

said power-code detector is a pseudo-noise code detector and is constructed to detect said first pseudo-noise code;

said starter-code detector is a pseudo-noise code detector and is constructed to detect said second pseudo-noise code.

5. The keyless motor vehicle starting system as defined in claim 1 wherein:

said power-code is a first error-detecting code;

said starter-code is a second error-detecting code;

said power-code detector is an error-detecting code detector and is constructed to detect said first error-detecting code;

said starter-code detector is an error-detecting code detector and is constructed to detect said second error-detecting code.

6. The keyless motor vehicle starting system as defined in claim 1 wherein:

said power switch is a flip-flop switch which comprises a D-flip-flop logic gate and a first bipolar junction transistor;

said D-flip-flop logic gate has an input clock, a D-input, a D-flip-flop output, and an inverted output which is connected to said D-input;

said D-flip-flop logic gate is triggered by a voltage-change at said input clock which is connected to the output of said power-code detector;

said D-flip-flop output is connected to a base of said first bipolar junction transistor and controls ON-OFF states of said first bipolar junction transistor;

said starter switch comprises a second bipolar junction transistor, a third bipolar junction transistor and a single-input NAND-gate whose output is connected to a base of said third bipolar junction transistor;

the output of said starter-code detector is connected to the input of said single-input NAND-gate and a base of said second bipolar junction transistor and controls ON-OFF states of said second bipolar junction transistor and said third bipolar junction transistor.

7. The keyless motor vehicle starting system as defined in claim 1 wherein:

said power switch is a flip-flop switch which comprises a D-flip-flop logic gate and a first relay;

said D-flip-flop logic gate has an input clock, a D-input, a D-flip-flop output, and an inverted output which is connected to said D-input;

said D-flip-flop logic gate is triggered by a voltage-change at said input clock which is connected to the output of said power-code detector;

said D-flip-flop output is connected to a solenoid of said first relay and controls ON-OFF states of said first relay;

said starter switch comprises a second relay, a third relay and a single-input NAND-gate whose output is connected to a solenoid of said third relay;

the output of said starter-code detector is connected to the input of said single-input NAND-gate and a solenoid of said second relay and controls ON-OFF states of said second relay and said third relay.

8. The keyless motor vehicle starting system as defined in claim 1 wherein:

said electromagnetic-wave modulator is a radio frequency modulator;

said electromagnetic-wave demodulator is a radio frequency demodulator.

9. The keyless motor vehicle starting system as defined in claim 1 wherein:

said electromagnetic-wave transmitting means is a transmitting antenna;

said electromagnetic-wave receiving means is a receiving antenna.

* * * * *